Patented Sept. 13, 1938

2,129,708

UNITED STATES PATENT OFFICE 2,129,708

UREA CELLULOSE SOLUTIONS

Richard S. Schreiber, Wilmington, Del., assignor to E. I. du Pont de Nemours & Company, Wilmington, Del., a corporation of Delaware No Drawing. Application July 1, 1937, Serial No. 151,459

9 Claims. (Cl. 106—40)

This invention relates to aqueous caustic alkali solutions of low substituted cellulose derivatives, and more particularly to the prevention of gelling of such solutions on standing.

In the preparation of formed objects (threads, films and the like) from low substituted cellulose ethers and the like, it is customary to dissolve the cellulose derivative in aqueous caustic alkali, form the resultant solution into the shape of the formed material desired, and thereafter coagulate (or regenerate) the cellulose derivative in the desired form. The use of such cellulosic bodies has been retarded because such solutions quite frequently gel during the time in which the solution must stand before the coagulation step takes place. The reason for the gelling appears to differ in the various types of low substituted cellulose derivatives.

This invention had for an object the preparation of aqueous caustic alkali solutions of low substituted derivatives having commercially desirable stability. Another object was the preparation of aqueous caustic alkali solutions of low substituted cellulose derivatives having improved stability, solubility, clarity, and like characteristics. Still another object was the preparation of useful products from such improved solutions. A general advance in art and other objects which will appear hereinafter are also contemplated.

It has now been found that aqueous caustic alkali solutions of low substituted cellulose derivatives having desirable and improved stability may be prepared by incorporating a zincate in the water-caustic alkali-low substituted cellulose derivative mixture.

The foregoing objects and related ends are accomplished by the present invention. In the following specific examples are disclosed certain embodiments of the invention as well as details of what is believed to be the best mode for carrying out the invention. The quantities are given in parts by weight throughout the application.

Example I

Urea-cellulose was prepared by steeping 200 parts of sulfite wood pulp in 2,000 parts of an aqueous solution containing 20% urea and 4% sodium hydroxide at 25° C. for 10 minutes, pressing to 500 parts (200 parts of pulp and 300 parts of solution) and baking at 130° C. for 40 minutes. The resultant product was washed well with water and dried at 55° C.

Example II

Twenty-one (21) parts of urea-cellulose prepared as described in Example I were thoroughly moistened with 86 parts of cold water (10° C.) in an insulated vessel (Dewar flask). The moist material was then treated with 93 parts of an aqueous solution containing 24% sodium hydroxide and 4.8% zinc oxide while stirring and kneading. The mixture soon (10 to 15 minutes) became pasty and free of lumpy material. To the resultant there was added 100 parts of finely crushed ice and the mass was again thoroughly stirred. The temperature of the mass fell to about —5° C., and after stirring for a short time (10 to 15 minutes) solution was complete. The resulting solution was clear, viscous, transparent, practically free of fibrous material, could readily be filtered and was stable indefinitely. At 25° C. films of the solution on a glass plate were treated with dilute (10 to 20%) sulfuric acid, washed with water and dried. There were obtained clear, tough, useful films of urea-cellulose.

Example III

Twenty-one (21) parts of urea-cellulose prepared as described in Example I were thoroughly moistened with 86 parts of cold water (10° C.) in an insulated vessel (Dewar flask). The moist material was then treated with 93 parts of an aqueous solution containing 24% sodium hydroxide, while stirring and kneading. After kneading for 10 to 15 minutes there was added 100 parts of finely crushed ice and the mass was again thoroughly stirred. The temperature of the mass fell to about —5° C., at which temperature stirring was continued for from 10 to 15 minutes. The resultant solution was hazy and contained more or less undissolved fibrous matter which made it non-homogeneous and unattractive in appearance. When maintained at ordinary laboratory temperatures for one hour the solution gelled.

Example IV

Twenty-one (21) parts of urea-cellulose prepared as described in Example I were thoroughly moistened with 86 parts of cold water (10° C.) in a container equipped with a cooling coil. The moist material was then treated with 93 parts of an aqueous solution containing 24% sodium hydroxide and 4.8% zinc oxide while stirring and kneading. The mixture soon (10 to 15 minutes) became pasty and free of lumpy material. To the resultant there was added 100 parts of water and the mass was again thoroughly stirred for from 10 to 15 minutes while cooling to —5° C., when solution was complete. The resulting solution was clear, viscous, transparent, practically free of fibrous material, could be readily filtered, and was stable indefinitely. At 25° C. films of the solution on a glass plate were treated with dilute (10 to 20%) sulfuric acid, washed with water and dried. There were obtained clear, tough, useful films of urea-cellulose.

Example V

Three (3) parts of urea-cellulose prepared as described in Example I were treated with 97 parts of an aqueous solution containing 8% of caustic soda and 1.6% zinc oxide and the mass thoroughly stirred until a homogeneous mixture having the consistency of paste was obtained. The mixture was then cooled in a suitable vessel with stirring and kneading until its temperature had fallen to −5° C. to −8° C. After stirring for 10 to 20 minutes, solution was practically complete. The cooling was then interrupted and the mixture allowed to come back to room temperature. The resulting solution was clear, easily filtered, substantially free of fibrous material, and was stable indefinitely (more than a month) at ordinary room temperature. Dry films prepared from this solution as described in Example II were clear, tough, and free of suspended matter.

Example VI

Three (3) parts of urea-cellulose prepared as described in Example I were treated with 97 parts of an aqueous solution containing 8% of caustic soda, and the mass thoroughly stirred until a homogeneous mixture having the consistency of paste was obtained. The mixture was then cooled in a suitable vessel with stirring and kneading until its temperature had fallen to −5° to −8° C. After stirring from 10 to 20 minutes the cooling was interrupted and the mixture allowed to come back to room temperature. The resulting solution was stable for only about one week at room temperature. It was difficult to filter and contained considerable suspended fibrous material. Dry films prepared from this solution in the manner previously described were not as clear and attractive in appearance as those prepared from solutions containing sodium zincate.

Example VII

Twenty-one (21) parts of urea-cellulose prepared as described in Example I were thoroughly moistened with 86 parts of cold water (10° C.) in an insulated vessel (Dewar flask). The moist material was then treated with 93 parts of an aqueous solution containing 24% sodium hydroxide and 4.8% beryllium oxide, while stirring and kneading. The mixture soon (10 to 15 minutes) became pasty and free of lumpy material. To the resultant there was added 100 parts of finely crushed ice and the mass again thoroughly stirred. The temperature of the mass fell to about −5° C., and after stirring for a short time (10 to 15 minutes), solution was complete. The resulting solution was clear, viscous, transparent, practically free of fibrous material, could be readily filtered and was stable indefinitely. At 25° C. films of the solution on a glass plate were treated with dilute (10 to 20%) sulfuric acid, washed with water and dried. There were obtained clear, tough, useful films of urea-cellulose.

Example VIII

Twenty-one (21) parts of urea-cellulose prepared as described in Example I were thoroughly moistened with 86 parts of cold water (10° C.) in a container equipped with a cooling coil. The moist material was then treated with 93 parts of an aqueous solution containing 24% sodium hydroxide and 4.8% beryllium oxide while stirring and kneading. The mixture soon (10 to 15 minutes) became pasty and free of lumpy material. To the resultant there was added 100 parts of water and the mass was again thoroughly stirred for from 10 to 15 minutes while cooling to −5° C., when solution was complete. The resulting solution was clear, viscous, transparent, practically free of fibrous material, could be readily filtered and was stable indefinitely. At 25° C. films of the solution on a glass plate were treated with dilute (10 to 20%) sulfuric acid, washed with water and dried. There were obtained clear, tough, useful films of urea-cellulose.

Example IX

Three (3) parts of urea-cellulose prepared as described in Example I were treated with 97 parts of an aqueous solution containing 8% of caustic soda and 1.6% beryllium oxide and the mass thoroughly stirred until a homogeneous mixture having the consistency of paste was obtained. The mixture was then cooled in a suitable vessel with stirring and kneading until its temperature had fallen to −5° C. to −8° C. After stirring for 10 to 20 minutes, solution was practically complete. The cooling was then interrupted and the mixture allowed to come back to room temperature. The resulting solution was clear, easily filtered, substantially free of fibrous material, and was stable indefinitely at ordinary room temperature. Dry films prepared from this solution as described in Example II were clear, tough, and free of suspended matter. Similar films were obtained from the solution after it had been standing for more than a month.

Example X

Cellulose formate containing 5% combined formic acid was prepared by steeping 25 parts of a hydrocellulose (having a viscosity of 50 cps. in 2.5% concentration in standard cuprammonium hydroxide) in 250 parts of commercial 85% formic acid for 24 hours at 25° C. The reaction product was washed free of acid with water and dried rapidly at 60° C.

Example XI

Four (4) parts of cellulose formate prepared as described in Example X were slurried with 96 parts of sodium zincate solution consisting of 10% sodium hydroxide and 3% zinc hydroxide (i. e., 10 parts of sodium hydroxide, 3 parts of zinc hydroxide and 87 parts of water) and cooled rapidly to a temperature of −5° C. while being stirred or kneaded. The mixture was held at this temperature for several minutes and then allowed to return to ordinary room temperature. The solution obtained was stable indefinitely and could be readily filtered. When spread on a glass plate, treated with 10 to 20% sulfuric acid, washed with water and dried, it gave clear, hard films.

Example XII

Four (4) parts of cellulose formate prepared as described in Example X were slurried with 96 parts of 10% sodium hydroxide solution and cooled rapidly to a temperature of −5° C. while being stirred or kneaded. The mixture was held at this temperature for several minutes and allowed to return to ordinary room temperature. The solution obtained gelled in approximately one day.

*Example XIII*

Cellulose acetate was prepared by treating 200 parts of sulfite pulp with a solution of 2000 parts of acetic acid, 500 parts of acetic anhydride, 3000 parts of benzene and 6 parts of sulfuric acid at 30° C. for 15 to 45 minutes. The pulp was then filtered, washed thoroughly with methyl alcohol and water and dried at 65° C.

*Example XIV*

Five (5) parts of the low-substituted cellulose acetate prepared as described in Example XIII was slurried with 95 parts of a sodium zincate solution containing 8% caustic soda and 1.6% zinc oxide. The mixture was cooled rapidly to approximately −8° C. The temperature was held at this point for several minutes and the mixture then allowed to return to room temperature. The mixture was continuously mixed by kneading throughout the above operations. The solution thus formed was substantially fiber free and could be filtered with ease. It was stable for more than two weeks. When spread on a glass plate and treated with dilute sulfuric acid as previously described, the solution yielded clear, hard films.

*Example XV*

Five (5) parts of low-substituted cellulose acetate prepared as described in Example XIII was slurried with 95 parts of an 8% caustic soda solution. The mixture was cooled rapidly to approximately −8° C. The temperature was held at this point for several minutes and the mixture allowed to return to room temperature. The mixture was continuously mixed by kneading throughout the above operations. The solution thus formed contained more undissolved fibrous material and was definitely less stable than the product of Example XIV which contained the stabilizer.

*Example XVI*

Methyl cellulose soluble in cold caustic soda was prepared by steeping 1000 parts of sulfite wood pulp in 10,000 parts of an aqueous solution containing 15% sodium hydroxide and 20% sodium methyl sulfate (i. e., NaOH 15%, NaCH₃SO₄ 20% and H₂O 65%), after which the sheets were pressed to 3400 parts and aged at 35° C. for 100 hours in the presence of a very small quantity of air. The sheets were then washed caustic free by steeping in hot water and finally dried.

*Example XVII*

Six (6) parts of the methyl cellulose obtained as described in Example XVI were slurried in 94 parts of a sodium zincate solution containing 6% sodium hydroxide and 1.2% zinc oxide. The slurry was cooled to approximately −8° while stirring. The stirring was continued while the mixture was held at −8° C. for several minutes and thereafter allowed to come to room temperature. The solution obtained was free of fibers, was readily filtered, and was stable indefinitely. Films cast from this solution by spreading on a glass plate and immersing in a bath composed of 10% sulfuric acid and 20% sodium sulfate had good wet strength and were clear and tough after drying.

*Example XVIII*

Six (6) parts of methylcellulose obtained as described in Example XVI were slurried in 94 parts of a 6% sodium hydroxide solution. The slurry was cooled to approximately −8° C. while stirring. The stirring was continued while the mixture was held at −8° C. for several minutes and thereafter allowed to come to room temperature. The solution thus obtained contained some undissolved fibrous material and gelled in one day at room temperature. Films prepared in the aforementioned manner from this solution were definitely hazy.

*Example XIX*

Glycol cellulose soluble in cold caustic soda was prepared by steeping 1000 parts of sulfite pulp for one hour in 10,000 parts of 18% sodium hydroxide solution at 25° C., pressing to 3000 parts, shredding for two hours at 25° C., and mixing for two hours at 20° C. in a closed vessel with 12 parts of ethylene oxide for each 480 parts of alkali cellulose.

*Example XX*

Seven and one-half (7.5) parts of glycol cellulose produced as described in Example XIX were slurried with 92.5 parts of a sodium zincate solution containing 6% sodium hydroxide and 1.2% zinc oxide. The slurry while being continuously mixed (kneaded, stirred) was cooled rapidly to −8° C. (both external and internal cooling devices being employed), held at −8° C. for several minutes, and then allowed to return to room temperature. The resulting solution was substantially fiberless and was stable for an indefinite period of time. It was readily filterable. When spread on a glass plate and treated with dilute sulfuric acid as described in preceding examples, clear, hard films were obtained.

*Example XXI*

Seven and one-half (7.5) parts of glycol cellulose produced as described in Example XIX were slurried with 92.5 parts of a 6% sodium hydroxide solution. The slurry while being continuously mixed (kneaded, stirred) was cooled rapidly to −8° C. (both external and internal cooling devices being employed), held at −8° C. for several minutes and then allowed to return to room temperature. The resulting solution was definitely less stable and contained more fibrous material than the solution prepared according to Example XX, in which sodium zincate was present as a stabilizer.

*Example XXII*

Cellulose glycolic acid soluble in cold dilute aqueous caustic soda was prepared by steeping 160 parts of high alpha-cellulose content sulfite cellulose for one hour in 1600 parts of 18% sodium hydroxide solution, after which the cellulosic body was pressed to 400 parts and shredded for 16 hours at 25° C. with 59 parts of dry sodium chloracetate. The resulting product was purified by washing with 1% sulfuric acid and then with water.

*Example XXIII*

A solution of the product of Example XXII was prepared by cooling to −10° C. an aqueous slurry containing 7% cellulose glycolic acid, 6% sodium hydroxide, and 1.2% zinc oxide (dissolved in the alkali solution). The cellulose glycolic acid was substantially completely soluble in the caustic-sodium zincate solution at 5° C. This solution containing the sodium zincate filtered much more easily and was much more stable at room temperature than the solution prepared according to Example XXIV, which contained alkali alone.

Example XXIV

A solution of the product of Example XXII was prepared by cooling to −10° C. an aqueous slurry containing 7% cellulose glycolic acid and 6% sodium hydroxide. The cellulose glycolic acid did not dissolve completely in the solution containing the caustic until the entire mass was frozen (at about −10° C.) whereas in the presence of sodium zincate (as indicated in Example XXIII) the same cellulose glycolic acid was practically completely dissolved at 5° C.

Example XXV

Methyl cellulose soluble in cold caustic soda was prepared by steeping 1000 parts of sulfite wood pulp in 10,000 parts of an aqueous solution containing 15% sodium hydroxide and 10% sodium methyl sulfate (i. e., NaOH 15%, $NaCH_3SO_4$ 10% and $H_2O$ 65%), after which the sheets were pressed to 3400 parts and aged at 35° C. for 100 hours in the presence of a very small quantity of air. The sheets were then washed caustic free by steeping in hot water and finally dried.

Six (6) parts of this product were insoluble in 94 parts of 10% aqueous caustic soda but dissolved readily in 94 parts of an aqueous solution containing 6% caustic soda and 1.2% zinc oxide when treated as described in Example XVII.

The "stabilizer" containing solution prepared as above described was clear, homogeneous and stable at room temperatures. When the cellulose derivative was coagulated in film form by treatment of films of the solution with dilute acids, salts, etc., and washed with water, clear, transparent films having remarkably high wet strength were obtained. Remarkably permanent laundry fast finishes were obtained when the solution was applied as a textile dressing (size) and coagulated with dilute acid, etc.

Example XXVI

Glycol cellulose soluble in cold caustic soda was prepared by steeping 1000 parts of sulfite pulp for one hour in 10,000 parts of 18% sodium hydroxide solution at 25° C., pressing to 3000 parts and shredding for two hours at 25° C. Four hundred and eighty (480) parts of this alkali cellulose were mixed for two hours at 20° C. with 5 parts of ethylene oxide in a closed vessel.

The resulting product while substantially insoluble in 10% aqueous caustic soda even on chilling dissolved in a 6% caustic soda-1.2% zinc oxide solution when treated as described in Example XX.

The "stabilizer" containing solution prepared as above described was clear, homogeneous and stable at room temperatures. When the cellulose derivative was coagulated in film form by treatment of films of the solution with dilute acids, salts, etc., and washed with water, clear transparent films having remarkably high wet strength were obtained. Remarkably permanent laundry fast finishes were obtained when the solution was applied as a textile dressing (size) and coagulated with dilute acid, etc.

Example XXVII

Cellulose glycolic acid soluble in cold dilute aqueous caustic soda was prepared by steeping 160 parts of high alpha-cellulose content sulfite cellulose for one hour in 1600 parts of 18% sodium hydroxide solution, after which the cellulosic body was pressed to 400 parts and shredded for 16 hours at 25° C. with 20 parts of dry sodium chloracetate. The resulting product was purified by washing with 1% sulfuric acid and then with water.

Five (5) parts by weight of the product thus obtained dissolved on chilling as described in Example XXIII in 95 parts by weight of an aqueous solution containing 6% sodium hydroxide and 1.2% zinc oxide. This sodium chloracetate was insoluble in 10% aqueous caustic soda even on chilling.

The "stabilizer" containing solution prepared as above described was clear, homogeneous and stable at room temperatures. When the cellulose derivative was coagulated in film form by treatment of films of the solution with dilute acids, salts, etc., and washed with water, clear, transparent films having remarkably high wet strength were obtained. Remarkably permanent laundry fast finishes were obtained when the solution was applied as a textile dressing (size) and coagulated with dilute acid, etc.

Sodium hydroxide is the alkali preferred in the preparation of the solutions of the low substituted cellulose derivatives. It has great economic advantages and is the alkali best known to and understood by the workers in the art. Other alkali metal hydroxides, for example, caustic potash, or mixtures of caustic alkalies, for example, caustic potash and caustic soda, may be satisfactorily used. Mention may also be made of the presence of the other alkali metals, for example, lithium and caesium, in the solution. For convenience in describing the invention caustic soda is usually referred to.

The invention has been found applicable to low substituted cellulose derivatives in general. Besides the urea cellulose and other low substituted cellulose derivatives such as the methyl cellulose, glycol cellulose, cellulose formate, cellulose acetate and cellulose glycolic acid of the specific examples, mention may also be made of such low substituted products as ethyl cellulose methyl ethyl cellulose, ethoxy ethyl cellulose, and cellulose acetate propionate.

The invention is not limited to the use of zinc compounds as stabilizers. The corresponding beryllium products give excellent solutions. The results with beryllium are not quite as desirable as those obtained with zinc. The stabilizers which have been found most effective are, in particular, sodium zincate and sodium beryllate, and in general the alkali metal salts of the amphoteric oxides and hydroxides of the elements of group II of the periodic system which are soluble in aqueous caustic alkali. Particular mention may be made of potassium zincate, potassium beryllate, lithium zincate, lithium beryllate, caesium zincate, caesium beryllate, etc.

The stabilizers may be prepared by various methods, including incorporating the amphoteric oxide in the caustic alkali solutions in various ways. In the preferred embodiment the oxide of zinc or beryllium is dissolved in the caustic solution prior to mixing with the low substituted cellulose derivative. Other satisfactory methods of incorporation include the addition of various zinc or beryllium salts to the solution of caustic alkali, and the addition of zinc or beryllium hydroxides to the solution of caustic alkali. In some cases a zincate and a beryllate may be used simultaneously in order to secure a joint effect. Preformed solutions of low substituted cellulose derivatives in aqueous caustic alkali may be stabilized and improved by the addition of zincates (or beryllates) or materials capable of forming zincates (or beryllates) in the solution. When salts of zinc or beryllium such as the chlorides or acetates are utilized as a source material, additional alkali is required to replace that used up in the formation of the zinc or beryllium hydroxide.

The expression "low substituted cellulose derivative" is generally recognized by the art and, as conventionally used, covers cellulose having up to not more than one mol. of substitution radical per glucose unit of cellulose. Some of these cellulose derivatives, particularly those of very low degrees of substitution (say 0.06 to .1 mol. of substitution per glucose unit of cellulose) have been found to have considerable commercial importance.

The term "urea cellulose" is used to cover a reaction product of urea and cellulose. For ease of calculation it is convenient to regard it as a cellulose carbamate and to figure the degree of substitution on this basis.

Experience indicates that 5% to 15% aqueous solutions of sodium hydroxide (containing the cellulose derivatives) are most suitable for carrying out the present invention, but useful results have been obtained by utilizing aqueous caustic alkali solution concentrations both above and below this range. The presence of a stabilizer somewhat extends the range of concentration of the caustic alkali solutions which have desirable solubilizing actions upon the low substituted cellulose derivatives.

The concentration of the alkali metal salt of the amphoteric hydroxide (i. e., the stabilizer) may be conveniently expressed as the percentage of the corresponding anhydrous oxide in question in the aqueous caustic alkali solution. Satisfactory concentrations range from about 0.1% to saturation. Expressed somewhat differently, the weight of the zinc or beryllium oxide in 100 grams of caustic alkali solution may vary from 0.1 gram to the limit of solubility of the oxide in the particular solution. Concentrations of about 0.5% to 2.5% sodium zincate (as zinc oxide) are particularly advantageous. The use of more of the zinc or beryllium source material than will dissolve in the specific caustic alkali solution is apparently of no advantage, although the same may be present somewhat in excess without detriment. Within practical limits an increase in the concentration of the stabilizer in the caustic alkali solution brings about an increased solvent action of the solution toward a given cellulose derivative and increases the stability of the resulting low substituted cellulose derivative solution. More concentrated solutions of low substituted cellulose derivatives can be prepared by the present invention than would otherwise be possible.

Conventional chemical equipment is satisfactory for carrying out the present invention. A simple open vessel may be used, the mixture of the low substituted cellulose derivative and the solution of the stabilizer in aqueous caustic being cooled (if necessary) at the appropriate time by surrounding the vessel with an external cooling bath or by the addition of ice. In lieu of ice, cooled water can sometimes be used, and if desired, more elaborate equipment such as a reaction vessel equipped with either or both external and internal cooling devices, such as cooling coils. The reaction vessel may be refrigerated with air when convenient and desirable. Combinations of various cooling devices are sometimes expedient. Unless the vessel is to be placed in an external cooling bath, it is best to have it well insulated. Materials not undesirably affected by aqueous caustic should be used in the construction of the reaction vessel. Agitation is often useful for facilitating or expediting preparation of the solutions.

The rate of cooling and subsequent warming of the aqueous mixtures or solutions of the low substituted cellulose derivative with the caustic alkali and stabilizer may be widely varied. The apparatus used, the efficiency of the cooling device, the size of the charge, the temperature of the environment, etc., influence the particular operating conditions selected.

According to the present preferred procedure, the low substituted cellulose derivative is moistened with three to five times its weight of water, and to it there is then added an amount of aqueous sodium hydroxide solution of 10% to 35% concentration containing sodium zincate equivalent to from 0.5% to 10% of zinc oxide, which with kneading or stirring will give a final caustic concentration in the low cellulose derivative solution of from 5% to 10% when later diluted with water. During the mixing stage, which is carried on until the mass is substantially homogeneous, the reaction mass is preferably cooled to prevent a temperature rise. The resulting solutions are then diluted with water to give the desired concentration of low substituted cellulose derivative, or to obtain a convenient viscosity. The mass is then cooled to lower its temperature to about 5° C. to −10° C., maintained at that temperature for several minutes, and then allowed to return to room temperature. The refrigeration to lower the temperature may take place before the addition of water to the solution initially produced. In some cases additional steps such as filtering and further dilution may be employed.

In carrying out the invention it is to be remembered that the stability and degree of solubility of a given low substituted cellulose derivative varies according to its nature as well as according to the concentration of the caustic alkali and of the stabilizer. Solutions of different low substituted cellulose derivatives and solutions of low substituted cellulose derivatives substituted by the same group but prepared by different procedures, may differ greatly in homogeneity (the amount of undissolved or merely swollen material), clarity (freedom from haze or finely suspended material), and stability (tendency to gel or set to a jelly). Lack of homogeneity and/or clarity of the solutions shows up as haziness, fibrous particle presence, etc., in dry films prepared from such solutions. The heretofore proposed procedures, such as filtering and centrifuging which may remove the larger fibrous particles, does not always give satisfactory finished products. The present simple and inexpensive process which consists simply in having a relatively small proportion of a stabilizer present when dissolving the low substituted cellulose derivative in aqueous caustic alkali, gives solutions characterized by improved homogeneity, clarity and stability.

The present process of dissolving low substituted cellulose derivatives in caustic alkali in the presence of a stabilizer enables the art to utilize low substituted cellulose derivatives which have not heretofore been of any practical value. This especially applies to the low substituted cellulose derivatives of the lower degrees of substitution and higher viscosity which were known to be insoluble or only slightly soluble in aqueous caustic alkali alone even though cooling to temperatures below about 5° C. is resorted to.

In many cases aqueous caustic alkali solutions of low substituted cellulose derivatives, as prepared by known methods, are so unstable that their utility is impaired or destroyed. They may gel or change in viscosity to such an extent that they become of no practical value. Aqueous caustic alkali solutions of the urea cellulose derivatives may gel within a few minutes or a week. The results obtained by using the above mentioned stabilizers in the urea cellulose solutions are quite striking, since gelation is prevented. This is true even with urea cellulose of variable concentration.

The low substituted cellulose derivative solutions prepared according to this invention are more useful than corresponding solutions heretofore known. A distinct economy in time and equipment is made possible according to the present process because the low substituted cellulose derivative solutions can be prepared with less chilling than would be necessary in conventional processes. The resulting solutions are distinctly superior to those prepared in the absence of such stabilizers. Hazy solutions are improved by the addition of the herein described stabilizers (this beneficial effect being more noticeable in the films and other coagulated formed objects from the caustic alkali solutions than in the solutions themselves). In those cases where the caustic alkali solution of the cellulose derivative has a tendency to gel, the tendency is greatly reduced and sometimes eliminated by the use of a stabilizer. In the case of low substituted cellulose derivatives of high solubility in aqueous caustic alkali, the beneficial effect of the stabilizer can be recognized by the fact that it is possible to dissolve the low substituted cellulose derivative at a higher temperature than would be possible in the absence of the stabilizer.

The aqueous caustic alkali low substituted cellulose derivative solutions (prepared as described here) after filtering, straining, or centrifuging (if necessary) may be employed in a wide variety of manufacturing processes. Special mention may be made of the sizing of cloth and paper. Yarns, threads, films and filaments prepared from such solutions have excellent properties. Generally speaking, the solution may be used for the manufacture of artificial threads and yarns, artificial hair, unsupported films and filaments, foils and pellicles, plastic coatings (on paper, textiles, leather, and the like), dressings and fillings for fabrics, and sizings (for yarns, book cloth, artificial leather and the like). The solutions are also useful in the preparation of shaped objects such as bottle caps, sponges, bands, etc., which may be formed for example by coagulating the cellulosic body over or in a mold of the desired shape and size and thereafter removing, washing, and preparing the less coagulated objects for the trade, for example by drying or storing in aqueous liquids such as dilute glycerine.

The urea cellulose solutions are capable of giving sized paper (by either beater or surface treatment) having excellent greaseproof properties.

As many apparently widely different embodiments of this invention may be made without departing from the spirit and scope thereof, it is to be understood that I do not limit myself to the specific embodiments thereof except as defined in the appended claims.

I claim:

1. The process which comprises treating a low substituted urea cellulose with aqueous caustic alkali in the presence of a zincate.

2. A composition of matter consisting of water, aqueous caustic alkali, urea cellulose and a member selected from the group consisting of zincates and beryllates.

3. The process which comprises mixing a urea cellulose obtained by steeping 200 parts of sulfite wood pulp in 2000 parts of an aqueous solution containing 20% urea and 4% sodium hydroxide at 25° C. for 10 minutes, pressing to 500 parts, baking at 130° C. for 40 minutes, washing with water, and drying at 55° C., with an aqueous solution obtained by dissolving 8 parts of sodium hydroxide and 1.6 parts of zinc oxide in 90.4 parts of water, there being 97 parts of the sodium hydroxide solution for each 3 parts of the urea cellulose, stirring until a homogeneous mass is obtained, coiling with stirring at −5° to −8° C., maintaining this temperature for 10 to 20 minutes, and allowing the resultant to come back to room temperature.

4. A composition of matter comprising urea cellulose dissolved in a caustic alkali solution of an amphoteric oxide of a metal of group II of the periodic system.

5. A composition of matter comprising urea cellulose dissolved in a caustic alkali solution of sodium zincate.

6. A composition of matter comprising urea cellulose dissolved in a solution consisting of water, sodium hydroxide and sodium zincate, in the proportion of 8 parts of sodium hydroxide and 90.4 parts of water for each 1.6 parts of zinc oxide.

7. The process which comprises mixing urea cellulose with an 8% aqueous sodium hydroxide solution containing a zincate, cooling to below 5° C., and allowing the resultant to come back to room temperature.

8. The process which comprises treating a low substituted urea cellulose with aqueous caustic alkali in the presence of a member selected from the group consisting of zincates and beryllates.

9. The process which comprises mixing urea cellulose with an aqueous sodium hydroxide solution of 5% to 15% strength containing a zincate, cooling to below 5° C., and allowing the resultant to come back to room temperature.

RICHARD S. SCHREIBER.